United States Patent [19]

Alten

[11] Patent Number: 4,516,366
[45] Date of Patent: * May 14, 1985

[54] SEAL FOR THE GAP BETWEEN THE EDGE OF A BUILDING OPENING AND THE BACK END OF A VEHICLE DRIVEN UP TO IT

[76] Inventor: Kurt Alten, Ringstr. 14, D-3015 Wennigsen, Fed. Rep. of Germany

[*] Notice: The portion of the term of this patent subsequent to Jan. 29, 2002 has been disclaimed.

[21] Appl. No.: 403,579

[22] Filed: Jul. 30, 1982

[30] Foreign Application Priority Data

Aug. 3, 1981 [DE] Fed. Rep. of Germany ....... 3130654

[51] Int. Cl.³ .............................................. E06B 7/16
[52] U.S. Cl. .............................................. 52/173 DS
[58] Field of Search .......................... 52/173 DS, 204; 14/71.5

[56] References Cited

U.S. PATENT DOCUMENTS

| | | | |
|---|---|---|---|
| 3,528,086 | 9/1970 | Conger | 52/173 DS |
| 3,638,667 | 2/1972 | Frommelt | 52/173 DS |
| 3,772,839 | 11/1973 | Timbers | 52/173 DS |
| 4,120,067 | 10/1978 | Hone | 14/71.5 |

FOREIGN PATENT DOCUMENTS 2712889 9/1978 Fed. Rep. of Germany ... 52/173 DS

*Primary Examiner*—John E. Murtagh
*Assistant Examiner*—Kathryn Ford
*Attorney, Agent, or Firm*—Becker & Becker, Inc.

[57] ABSTRACT

A seal for the gap between the edge of a building opening and the back end of a vehicle driven up to the opening. A covering of flexible material is arranged between a downwardly open U-shaped frame serving to hold the sealing apron on the one hand, and the building or the profiled members fastened thereto on the other hand. For the purpose of being able to quickly assemble and replace this covering, and also for the purpose of being able to balance or equalize stresses within the covering, the edges of the covering are inserted or drawn into longitudinal grooves of the profiled members located on the building and on the U-shaped frame. The edges are folded-over or doubled and surround a core. The edges are located in undercut longitudinal grooves, and in particular in such a manner that sliding movements of these edges are also possible during operational use of the seals.

12 Claims, 4 Drawing Figures

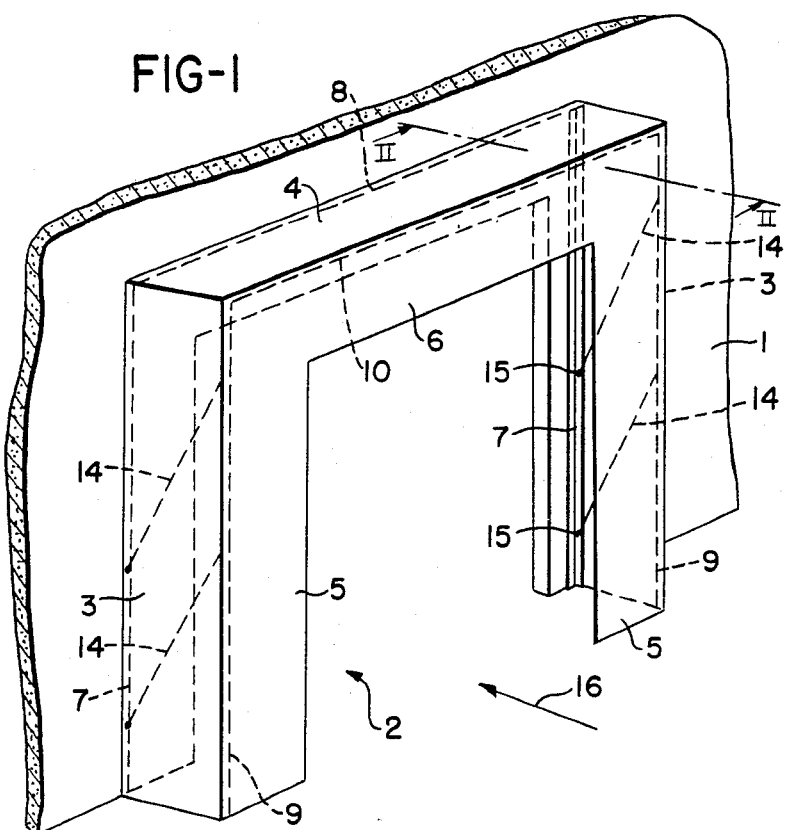
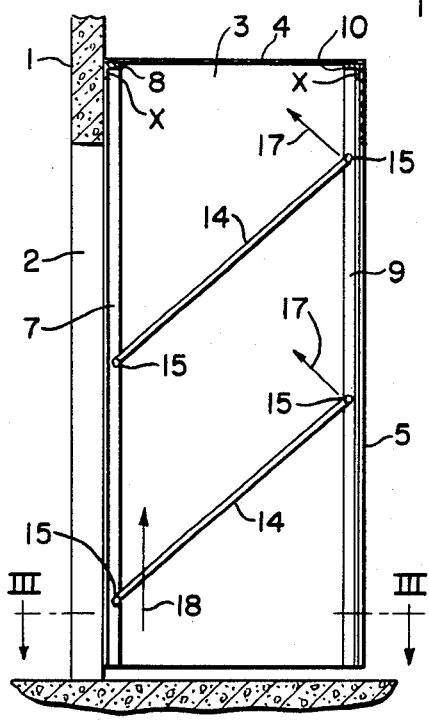
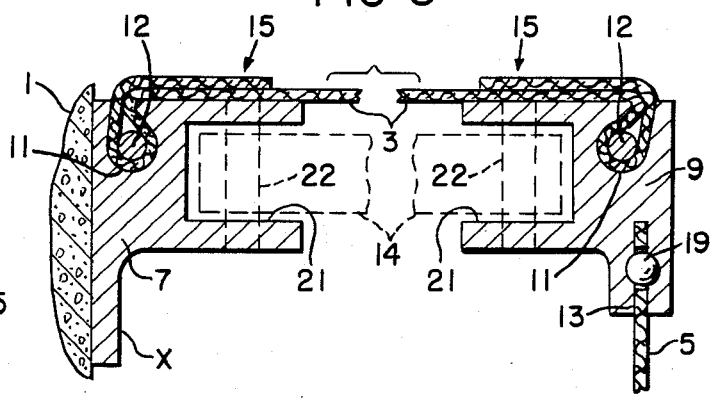
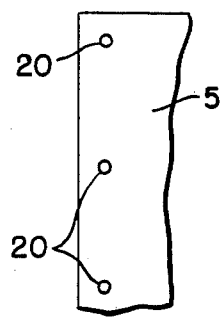

SEAL FOR THE GAP BETWEEN THE EDGE OF A BUILDING OPENING AND THE BACK END OF A VEHICLE DRIVEN UP TO IT

The present invention relates to a deformable seal for the gap between the edge of a building opening and the back end of a vehicle driven up to it. The seal has an apron which at the sides and at the top is fastened to a rigid, downwardly open U-shaped frame which comprises metal profiled members and is spaced from the building; the frame is held by inclined guides or links which are unchangeable in height, preferably at that end thereof facing the building; a flexible covering is provided on both sides as well as at the upper edge of the apron, and one edge of this covering is fastened to the frame, while the other edge is fastened to a profiled member located on the building.

BACKGROUND OF THE INVENTION

Field of the Invention

With known seals of this type, the apron and the covering are fastened to the U-shaped frame by clamping members. Although this fastening is strong if clamping strips are used in addition to spot-type effective fastening means, special difficulties result when the aforementioned elements must be interchanged or replaced due to damage or wear thereof.

SUMMARY OF THE INVENTION

It is an object of the present invention to improve the aforementioned seals in such a way that the covering and the apron can be quickly replaced, and additionally that distortions or deformations of these components cannot cause any special damage, whereby these distortions or deformations in operation, i.e. during deformation of the apron and of the covering, must be accepted as a system requirement or condition.

BRIEF DESCRIPTION OF THE DRAWINGS

This object, and other objects and advantages of the present invention, will appear more clearly from the following specification in connection with the accompanying drawing, in which:

FIG. 1 is a perspective view showing one inventive embodiment of a deformable seal at the edge of an opening of a building;

FIG. 2 is a section taken along line II—II in FIG. 1;

FIG. 3 is a section taken along line III—III in FIG. 2; and

FIG. 4 is a fragmentary view of a skirt or apron for the seal of the present invention.

DETAILED DESCRIPTION

The seal of the present invention is characterized primarily in that the profiled members are provided with undercut longitudinal grooves for the pulling or drawing-in of the edges of the apron and/or of the covering. The thickness of the edges can be increased by appropriate cores or the like in order to thus be able to bring about a positive connection between the edges and the profiled members. At the same time, the profiled members can be provided with further grooves in order to thus form for example the joints or connecting locations for the inclined guides. The legs on both sides of these grooves serve to receive joint bolts.

This mounting of the apron edges and covering edges has the great advantage that the aprons and the covering can be connected very quickly with the profiled members by a longitudinal movement, or can be separated therefrom by withdrawal. At the same time, it is now possible to adapt the edges of the apron and of the covering in such a manner to the cross section of these longitudinal grooves, that certain longitudinal movements of the edges are possible with respect to the profiled members. This has as a consequence that inclined load forces do not lead to tearing or ripping, but rather lead to a resilient or elastic yieldable shifting of the mentioned edges.

According to further specific features of the present invention, the edges may have openings for receiving holding elements, such as balls, the thickness of which is greater than the thickness of the edges; furthermore, the longitudinal grooves may have a widened portion corresponding to the holding elements.

The edges may be arranged so as to be longitudinally shiftable, i.e. shiftable in height, in the longitudinal grooves, and in particular after assembly. The edges, preferably in the region of the upper end of the longitudinal grooves, may be secured against shifting.

The profiled members closest to the building may have at least two longitudinal grooves, and the other profiled members may have at least three longitudinal grooves. The front U-shaped frame with the apron may be held in the rest position by the covering.

The cores may serve to hold the covering, and the holding elements may serve to fasten the apron.

The present invention also provides a method for mounting the covering of the inventive seal; this method includes the step of reducing the spacing of the U-shaped frame from the building or the other profiled member in order to simplify insertion of the edges.

Referring now to the drawing in detail, the building 1, for instance a warehouse, has an opening 2 up to which the back end of vehicles can be driven for loading and unloading purposes. A covering 3 is located on both sides of the opening 2 and extends at right angles in particular extends vertically upwardly. A horizontally arranged covering is located thereabove as a transverse covering 4. These coverings establish a connection from the building 1 to an apron which on both sides of the opening 2 has a vertical segment 5 and a horizontal segment 6. The sheets of material forming the apron and the covering are made of foils, webs of material, possibly rubberized, etc.

The opening 2 is surrounded by a U-shaped frame which is formed by vertical legs 7 and a horizontal crosspiece 8. These parts are metal profiled members, and are rigidly connected with the building 1 by bolts or the like. Furthermore, these parts serve for fastening the covering 3 and the transverse covering 4. Those edges of the parts 3, 4 remote from the building 1 are connected with a further U-shaped frame which comprises vertical profiled members 9 and horizontal profiled members 10, both made of metal.

The profiled members 7, 9 have longitudinal grooves 11 which are rounded and undercut. These grooves 11 serve to receive the folded over or doubled edges of the covering 3. So that these edges cannot be pulled from the longitudinal grooves 11 by horizontal forces, the folded over edges surround a rod-like core 12. A good fastening can be attained by a suitable selection of the cores 12; furthermore, there can also be attained that both of the edges can be pulled or drawn into the profiled members 7, 9 from one end thereof, and in particular in such a way that the possibility of displacement in the longitudinal grooves 11 in the direction of arrow 18 remains not only for pulling or drawing in, but also for the operation.

An undesired slipping or sliding-out of the covering 5 can be avoided via fixation at the upper end of the profiled member, for instance at x.

The edges of the segments 5, 6 of the apron engage in a groove 13 having a width slightly greater than the thickness of the apron. Balls 19 are provided to effect an insertion of these edges and to thereafter prevent a withdrawal or pulling-out transverse to the longitudinal direction of the groove 13. The balls 19 are placed in openings 20 arranged in a row at the edge of the apron; in the installed state, the balls occupy a widened portion located at about half the depth of the groove 13.

The apron forms the actual seal, and deforms when struck or contacted by a vehicle, whereupon a pressure is exerted upon the apron in the direction of the arrow 16. This leads to pivoting of the inclined upwardly directed guides 14 in the direction of the arrow 17; these guides 14 are joined to the profiled members 7 and 9 at the joints 15.

In order to be able to carry out such a connection or joinder in a simple manner, the profiled members have further longitudinal grooves 21, the width of which corresponds to the guide width. The legs located on both sides of the longitudinal grooves 21 serve for mounting bearing bolts 22.

The seal is held in position by its own weight; to a certain extent the seal is suspended in the guides 14 which, however, because of the covering 3, remain in the illustrated position. Normally, the covering is therefore stretched or made taut.

In order to be able to assemble the covering 3 under these conditions, the spacing of the frame 9, 10 from the building 1 is reduced by pivoting the guides 14 upwardly. After this position is fixed, for instance by a cable, the covering 3 can be readily inserted or introduced into the grooves 11. The cable or the arresting means is released after the covering 3 has been pulled in and fixed, for instance at x. Accordingly, the guides pivot again into their starting position accompanied by an appropriately stretched covering 3.

It is to be understood that for the foregoing reasons the apron and the covering 3 could be made in three parts in order thus to be able to insert the individual sheets or segments more easily into the grooves 11, 13. Additionally, the vertical segment 5 of the apron is fixed by a transverse pin or the like in the region of the upper end.

The present invention is, of course, in no way restricted to the specific disclosure of the specification and drawing, but also encompasses any modifications within the scope of the appended claims.

What is claimed is:

1. A deformable seal for a gap between the edges of an opening of a building and a back end of a vehicle driven up to said opening, said seal comprising in combination:
   a rigid, inverted U-shaped frame which is spaced from said building and comprises first metallic profiled members;
   inclined upwardly directed guides having a first and connected to said frame, and a second end which is operatively connected to said building so that said rigid, inverted U-shaped frame is held by said inclined upwardly directed guides unchangeable in height thereof;
   an apron having a first outer edge fastened to said first metallic profiled members, and a second edge directed inwardly upon itself for effecting sealing with said vehicle so that said apron forms the actual seal and deforms when struck or contacted by a vehicle whereupon pressure is exerted upon said apron that leads to pivoting of said inclined upwardly directed guides;
   second profiled members connected to said building; and
   a flexible covering located between said apron and said building, said covering having a first edge fastened to said first metallic profiled members in the vicinity of said first outer edge of said apron, and a second edge fastened to said second profiled members; said profiled members being provided with undercut longitudinal grooves for insertion of at least one of said first outer edge of said apron, and said first and second edges of said flexible covering, said flexible covering and said apron being quickly replaceable and additionally distortions and deformations thereof are accepted without causing any special damage in operation therewith as a consequence thereof that inclined load forces are kept from leading to any tearing or ripping but rather lead to a resilient, elastically yieldable shifting of the associated edges so that relative height changes can be equalized through nominal shifting movements of said edges of said flexible covering in the longitudinal grooves and, consequently, rather than a rigid fastening there is provided a shiftable mounting and fastening.

2. A seal in combination according to claim 1, in which a core is disposed in at least some of said grooves, and in which those portions of said edges arranged in said last mentioned grooves are folded over and surround said core.

3. A seal in combination according to claim 2, in which at least some of said edges have openings for receiving holding elements, the thickness of which is greater than the thickness of the associated edges; and in which said grooves in which said last mentioned edges are inserted are provided with a widened portion which corresponds to said holding elements.

4. A seal in combination according to claim 3, in which said cores serve to hold said covering, and said holding elements serve to fasten said apron.

5. A seal in combination according to claim 4, in which said holding elements are balls placed in openings arranged in a row along an edge of said apron and said balls in an installed state occupy the widened portion located at about half of the depth of the groove therewith.

6. A seal in combination according to claim 1, in which said edges are shiftable, in the longitudinal direction of said profiled members, in said longitudinal grooves.

7. A seal in combination according to claim 6, in which said edges in portions thereof are secured against shifting.

8. A seal in combination according to claim 1, in which said profiled members, on sides facing one another, are provided with further longitudinal grooves for receiving said guides and forming a connecting location thereof to said building.

9. A seal in combination according to claim 7, in which said profiled members include legs on each side of said further longitudinal groove for receiving joint bolts for effecting connection of said guides to said profiled members.

10. A seal in combination according to claim 8, in which said second profiled members are provided with at least two longitudinal grooves, and said first profiled members are provided with at least three longitudinal grooves.

11. A seal in combination according to claim 1, in which said U-shaped frame, which supports said apron, is held in a rest position by said covering.

12. A method for mounting said covering of the seal of claim 1, which includes in combination therewith the step of reducing the distance of said U-shaped frame from said building to simplify insertion of said edges of said covering into said longitudinal grooves.

* * * * *